Sept. 23, 1941.     J. H. DE BOER ET AL     2,256,861
WELDING ROD
Filed Nov. 13, 1939
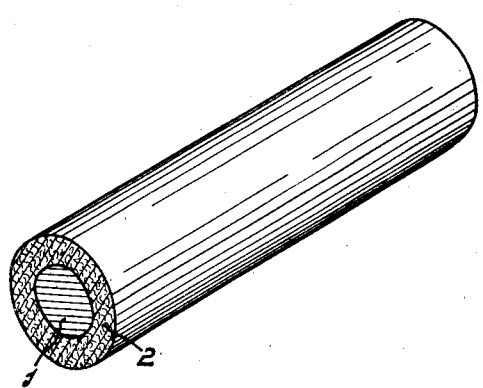
INVENTORS
JAN HENDRIK DE BOER
JACOB SACK and
PAUL CHRISTIAAN VAN DER WILLIGEN
By
Lee B. Kemon
ATTORNEY.

Patented Sept. 23, 1941

2,256,861

UNITED STATES PATENT OFFICE 2,256,861

WELDING ROD

Jan Hendrik de Boer, Jacob Sack, and Paul Christiaan van der Willigen, Eindhoven, Netherlands, assignors, by mesne assignments, to Hartford National Bank and Trust Company, Hartford, Conn., trustee Application November 13, 1939, Serial No. 304,268
In Germany November 29, 1938

7 Claims. (Cl. 219—8)

Our invention relates to welding rods and more particularly to coatings for such rods and to a method of forming the same.

Such coatings usually contain an organic substance or filler which aids in the formation of a reducing gaseous sheath, and for this purpose substances such as wheat flour, rye flour, and saw-dust are generally used.

To be satisfactory for use in a coating material an organic substance must meet several requirements. For example, if the coating is to be applied by dipping the metallic core into a suspension of the coating material, the organic substance must be one which can be finely pulverized and which does not swell to any appreciable degree in the suspension liquid, in which a silicious varnish serving as a binding agent is frequently dissolved. Furthermore, the organic substance should not have a fibrous structure because this would cause the suspension to become too gelatinous. In addition, and irrespective of the manner in which the coating is applied, the organic substance should have a relatively low nitrogen content so that during the welding only a small amount of nitrogen can be absorbed by the molten metal and there will be little odor. The organic substance should be inexpensive and readily available and it is very important that it should cause the minimum amount of splattering during the welding.

We have found that the above requirements can be satisfied and that greatly improved coatings can be obtained by using as the organic substance ground ivory nuts. Such nuts frequently referred to as vegetable ivory include the nuts of the South American pinnate-leaved palms (*Phytelephas macrocarpa*) and of the ivory nut palms of the Carolina Island (*Coelococcus carolinensis* or *Coelococcus amicarum*).

The coating materials containing an organic substance according to the invention have the further advantage that they become less sensitive to moisture during storage in dry air.

In order that our invention may be clearly understood and readily carried out we shall describe the same in more detail with reference to several specific examples and to the accompanying drawing in which the single figure is a sectionized perspective view on an enlarged scale of a coated welding electrode.

The welding electrode shown in the drawing comprises a metallic core 1 of any suitable composition, which is provided with a coating 2 formed of a material containing ground ivory nuts. The ground ivory nut material is mixed in the usual manner with the other ingredients of the coating material, such as iron or titanium ore powder and with substances such as alkaline and alkaline earth carbonates together with a binding agent such as silicious varnish.

The following two examples give the composition of two powdered mixtures containing the organic substance according to the invention.

Example I

| Material | Percent by weight |
| --- | --- |
| Ilmenite | 45 to 75 |
| Ground kernels of ivory nuts | 10 to 25 |
| Kaoline | 10 to 20 |
| Magnesium carbonate | 5 to 15 |

Example II

| Material | Percent by weight |
| --- | --- |
| Titanium dioxide | 30 to 60 |
| Clay | 10 to 20 |
| Calcium carbonate | 5 to 15 |
| Ferro-manganese | 5 to 30 |
| Ground kernels of ivory nuts | 10 to 25 |

The above compositions can be placed in a suspension and applied by dipping the core therein or they can be formed into a suitable material for application by extrusion.

While we have described our invention with reference to specific examples we do not wish to be limited thereto as obvious modifications will appear to one skilled in the art.

What we claim is:

1. A welding rod comprising a core, and a coating on said core and containing ground ivory nuts.

2. As an organic filler for a welding rod coating material, ground ivory nuts.

3. As an organic filler for a welding rod coating material, ground nuts of the South American pinnate-leaved palms (*Phytelephas macrocarpa*).

4. As an organic filler for a welding rod coating material, ground nuts of the ivory nut palms of the Carolina Islands (*Coelococcus carolinensis*).

5. A welding rod comprising a core, and a coating on said core and containing as an organic substance ground nuts of the South American pinnate-leaved palms (*Phytelephas macrocarpa*).

6. A welding rod comprising a core, and a coating on said core and containing as an organic substance ground nuts of the ivory nut palms of the Carolina Islands (*Coelococcus carolinensis*).

7. A welding rod coating composition containing ground ivory nuts.

JAN HENDRIK DE BOER.
JACOB SACK.
PAUL CHRISTIAAN VAN DER WILLIGEN.